United States Patent
Fan

(10) Patent No.: US 9,479,956 B2
(45) Date of Patent: Oct. 25, 2016

(54) METHOD AND APPARATUS FOR TRANSMITTING AND PROCESSING USER EQUIPMENT FEEDBACK INFORMATION

(71) Applicant: HUAWEI TECHNOLOGIES CO., LTD., Shenzhen (CN)

(72) Inventor: Shuju Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 14/310,455

(22) Filed: Jun. 20, 2014

(65) Prior Publication Data

US 2014/0341055 A1    Nov. 20, 2014

Related U.S. Application Data

(63) Continuation of application No. PCT/CN2012/085232, filed on Nov. 26, 2012.

(30) Foreign Application Priority Data

Dec. 23, 2011   (CN) .......................... 2011 1 0437654
May 10, 2012   (CN) .......................... 2012 1 0143272

(51) Int. Cl.
*H04W 24/10*    (2009.01)
*H04B 7/06*     (2006.01)
*H04B 7/04*     (2006.01)

(52) U.S. Cl.
CPC ........... *H04W 24/10* (2013.01); *H04B 7/0456* (2013.01); *H04B 7/063* (2013.01); *H04B 7/0617* (2013.01);

(Continued)

(58) Field of Classification Search
CPC .................................................. H04W 24/10
See application file for complete search history.

(56) References Cited

U.S. PATENT DOCUMENTS

| 2008/0043867 | A1* | 2/2008 | Blanz ..................... | H04B 7/063 375/260 |
| 2008/0165698 | A1* | 7/2008 | Dalsgaard ............. | H04W 24/10 370/252 |
| 2009/0052405 | A1* | 2/2009 | Ko ....................... | H04B 7/0417 370/335 |

(Continued)

FOREIGN PATENT DOCUMENTS

| CN | 101432985 A | 5/2009 |
| CN | 101507139 A | 8/2009 |

(Continued)

OTHER PUBLICATIONS

Chinese Office Action dated Feb. 2, 2015 in corresponding Chinese Patent Application No. 201210143272.8 (6 pages).

(Continued)

*Primary Examiner* — Rasheed Gidado
(74) *Attorney, Agent, or Firm* — Staas & Halsey LLP

(57) ABSTRACT

A method and an apparatus for transmitting and processing user equipment feedback information are disclosed by the present invention, related to the field of radio communication technologies, and with the present invention, a user equipment is capable of transmitting feedback information with a maximum channel RI value of 4. The method includes: obtaining rank information (RI) of a radio channel, a corresponding channel quality indication information (CQI) value, and a precoding control information (PCI) value, where an RI value is any one of 1, 2, 3, and 4; and generating feedback information according to the CQI value and the PCI value, and sending the feedback information to a base station according to a CQI feedback pattern. Embodiments of the present invention are mainly applicable to a process of transmitting user equipment feedback information.

18 Claims, 11 Drawing Sheets

(52) U.S. Cl.
CPC .......... *H04B 7/0619* (2013.01); *H04B 7/0621* (2013.01); *H04B 7/0632* (2013.01); *H04B 7/0639* (2013.01)

(56) References Cited

U.S. PATENT DOCUMENTS

| | | | |
|---|---|---|---|
| 2009/0110038 A1* | 4/2009 | Montojo | H04L 1/003 375/211 |
| 2009/0238256 A1* | 9/2009 | Onggosanusi | H04L 5/0007 375/228 |
| 2010/0296595 A1* | 11/2010 | Senba | H04B 7/0628 375/260 |
| 2011/0080968 A1 | 4/2011 | Seo et al. | |
| 2011/0111781 A1* | 5/2011 | Chen | H04B 7/02 455/507 |
| 2011/0122971 A1* | 5/2011 | Kim | H04B 7/0417 375/316 |
| 2011/0142147 A1* | 6/2011 | Chen | H04L 25/03343 375/260 |
| 2011/0249656 A1* | 10/2011 | Cai | H04L 1/0028 370/336 |
| 2012/0128084 A1* | 5/2012 | Aguirre | H04W 72/048 375/260 |

FOREIGN PATENT DOCUMENTS

| | | |
|---|---|---|
| CN | 102084602 A | 6/2011 |
| WO | WO 2011/024825 A1 | 3/2011 |
| WO | WO 2011/100646 A1 | 8/2011 |

OTHER PUBLICATIONS

Chinese Search Report Jan. 11, 2015 in corresponding Chinese Patent Application No. 201210143272.8 (2 pages).

International Search Report and Written Opinion—Forms PCT/ISA 210, PCT/ISA/220 and PCT/ISA/237, dated Nov. 26, 2012 in corresponding International Patent Application No. PCT/CN2012/085232 (12 pages).

\* cited by examiner

METHOD AND APPARATUS FOR TRANSMITTING AND PROCESSING USER EQUIPMENT FEEDBACK INFORMATION

CROSS-REFERENCE TO RELATED APPLICATIONS

This application is a continuation of International Application No. PCT/CN2012/085232, filed on Nov. 26, 2012, which claims priority to Chinese Patent Application No. 201110437654.7, filed on Dec. 23, 2011 and Chinese Patent Application No. 201210143272.8, filed on May 10, 2012, all of which are hereby incorporated by reference in their entireties.

TECHNICAL FIELD

Embodiments of the present invention relate to the field of radio communication technologies, and in particular, to a method and an apparatus for transmitting and processing user equipment feedback information.

BACKGROUND

At present, the third-generation mobile communication system introduces a 2×2 MIMO (Multiple-input Multiple-output, multiple-input multiple-output) technology to increase a downlink data transmission rate. Specifically, after a primary transport block and a secondary transport block (if any) undergo transmission channel processing (namely, code modulation), the two blocks undergo spread spectrum and are scrambled. Then a primary data stream and a secondary data stream each are weighted by using a weight and the two data streams are sent to two antennas, respectively, and are combined with other data for transmission. A scheduling policy used by a base station such as a transport block size and used weight information depends on channel quality indication information (CQI, Channel Quality Indication) and precoding indication information (PCI, Precoding Control Indication) fed back by a user equipment. In the 2×2 MIMO technology, one piece of feedback information of a user equipment includes a maximum of two CQI values, and can indicate that channel rank information (RI, Rank Indication) is maximally 2.

During the implementation of transmission of user equipment feedback information, the inventor finds that the prior art has at least the following problem: At present, in the 4-antenna technology introduced by the third-generation mobile communication system to further increase the downlink data transmission rate, the channel RI value is maximally 4, but in the conventional 2×2 MIMO technology, feedback information can only indicate that the RI value is maximally 2.

SUMMARY

Embodiments of the present invention provide a method and an apparatus for transmitting and processing user equipment feedback information, so that a user equipment is capable of transmitting feedback information with a maximum channel RI value of 4.

To achieve the preceding objectives, the embodiments of the present invention adopt the following technical solutions:

A method for transmitting user equipment feedback information includes:

obtaining rank information (RI) of a radio channel, a corresponding channel quality indication information (CQI) value, and a precoding control information (PCI) value, where an RI value is any one of 1, 2, 3, and 4; and generating feedback information according to the CQI value and the PCI value, and sending the feedback information to a base station according to a CQI feedback pattern.

A method for processing user equipment feedback information includes:

receiving feedback information sent by a user equipment, where the feedback information includes a CQI value and a PCI value; and parsing the feedback information, and obtaining an RI value according to the CQI value or the PCI value.

An apparatus for transmitting user equipment feedback information includes:

an obtaining unit, configured to obtain rank information (RI) of a radio channel, a corresponding channel quality indication information (CQI) value, and a precoding control information (PCI) value, where an RI value is any one of 1, 2, 3, and 4; and a generating unit, configured to generate feedback information according to the CQI value and the PCI value obtained by the obtaining unit, and send the feedback information to a base station according to a CQI feedback pattern.

An apparatus for processing user equipment feedback information includes:

a receiving unit, configured to receive feedback information sent by a user equipment, where the feedback information includes a CQI value and a PCI value; and a parsing unit, configured to parse the feedback information received by the receiving unit, and obtain an RI value according to the CQI value or the PCI value.

With the method and apparatus for transmitting and processing user equipment feedback information according to the embodiments of the present invention, a corresponding method for generating user equipment feedback information is set for either of RI values 3 and 4, and feedback is performed according to a feedback pattern, so that a user equipment is capable of transmitting feedback information with a maximum channel RI value of 4.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
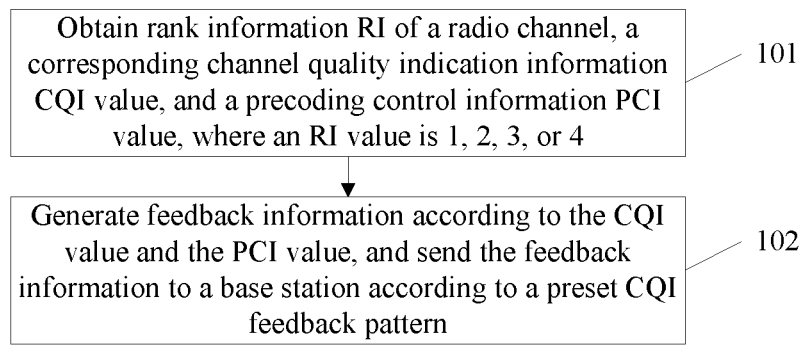
FIG. 1 is a flowchart of a method for transmitting user equipment feedback information according to Embodiment 1 of the present invention.

The embodiment of the present invention provides a method for transmitting user equipment feedback information. As shown in FIG. 1, the method is a method at a user equipment side and includes the following:

101. Obtain rank information RI of a radio channel, a corresponding channel quality indication information CQI value, and a precoding control information PCI value, where an RI value is any one of 1, 2, 3, and 4.

It should be noted that the obtaining RI of a radio channel, a corresponding CQI value, and a PCI value may be implemented in the following way, which specifically includes:

obtaining time for sending CQI, and obtaining a CQI type corresponding to the sending time according to a preset CQI feedback pattern, where the CQI type identifies an RI value;

obtaining, in a precoding set corresponding to the RI value identified by the CQI type, a precoding matrix matching a channel parameter of a radio channel, and using a rank value of the matching precoding matrix as the RI value of the radio channel;

determining the corresponding PCI value according to the matching precoding matrix;

obtaining a transportable data block size by calculation according to the matching precoding matrix and the parameter of the radio channel, and obtaining an index corresponding to the transportable data block size according to the transportable data block size; and performing a complex operation on the index corresponding to the transportable data block size according to a formula and the RI value that are corresponding to the CQI type, and obtaining a CQI value.

The CQI types include two CQI types Type A and Type B, or three CQI types Type A, Type B, and Type C, or four CQI types Type A, Type B, Type C, and Type D.

When there are two CQI types Type A and Type B, the RI value identified by the CQI type is: the RI value identified by Type A is any one of 1, 2, 3, and 4, and the RI value identified by Type B is 1.

When there are three CQI types Type A, Type B, and Type C, the RI value identified by the CQI type is: the RI value identified by Type A is either of 1 and 2, the RI value identified by Type B is 1, and the RI value identified by Type C is either of 3 and 4.

When there are four CQI types Type A, Type B, Type C, and Type D, the RI value identified by the CQI type is: the RI value identified by Type A is either of 1 and 2, the RI value identified by Type B is 1, the RI value identified by Type C is any one of 1, 2, and 3, and the RI value identified by Type D is any one of 1, 2, 3, and 4; or the RI value identified by Type A is either of 1 and 2, the RI value identified by Type B is 1, the RI value identified by Type C is either of 1 and 3, and the RI value identified by Type D is either of 1 and 4.

The preset CQI feedback pattern includes the following:

When the CQI feedback pattern includes two CQI types Type A and Type B, the preset CQI feedback pattern is:

$$\underbrace{TypeA, \ldots, TypeA}_{N\_cqi\_typeA}, \overbrace{TypeB, \ldots, TypeB}^{M\_cqi} \underbrace{TypeA, \ldots, TypeA}_{N\_cqi\_typeA}, \overbrace{TypeB, \ldots, TypeB}^{M\_cqi};$$

where, M_cqi and N_cqi_Type A are parameters configured on a network side, and used to adjust the number of Type A and Type BType C, and the value range of N_cqi_Type A is 0 to M_cqi.

When the CQI feedback pattern includes three CQI types Type A, Type B, and Type C, the preset CQI feedback pattern is:

$$\underbrace{TypeC, \ldots, TypeC}_{N\_cqi\_typeC}, \underbrace{TypeA, \ldots, TypeA}_{N\_cqi\_typeA}, \overbrace{TypeB, \ldots, TypeB}^{M\_cqi}$$

where, M_cqi, N_cqi_Type A, and N_cqi_Type C are parameters configured on the network side, and used to adjust the number of Type A, Type B, and Type C, the value ranges of N_cqi_Type A and N_cqi_Type C are 0 to M_cqi, and a sum of N_cqi_Type A and N_cqi_Type C is smaller than or equal to M_cqi.

When the CQI feedback pattern includes four CQI types Type A, Type B, Type C, and Type D, the preset CQI feedback pattern is:

$$\underbrace{\underbrace{TypeD, \ldots, TypeD}_{N\_cqi\_typeD}, \underbrace{TypeC, \ldots, TypeC}_{N\_cqi\_typeC}, \underbrace{TypeA, \ldots, TypeA}_{N\_cqi\_typeA}, TypeB, \ldots, TypeB}_{M\_cqi};$$

where, M_cqi, N_cqi_Type A, N_cqi_Type C, and N_cqi_Type D are parameters configured on the network side, and used to adjust the number of Type A, Type B, Type C, and Type D, and the value ranges of N_cqi_Type A, N_cqi_Type C, and N_cqi_Type D are 0 to M_cqi, and a sum of N_cqi_Type A, N_cqi_Type C, and N_cqi_Type D is smaller than or equal to M_cqi.

It should be noted that correspondence between a PCI value and a precoding matrix may be shown in Table 1 and Table 2, or may be set freely according to a practical situation. The embodiment of the present invention does not limit the setting of the correspondence between a PCI value and a precoding matrix.

TABLE 1

Correspondence between a PCI value and a precoding matrix when an RI value is 1

| Codebook Index (PCI) | RI = 1 |
|---|---|
| 0-7 | $\frac{1}{2}\begin{bmatrix}1\\1\\1\\-1\end{bmatrix} \frac{1}{2}\begin{bmatrix}1\\1\\j\\j\end{bmatrix} \frac{1}{2}\begin{bmatrix}1\\1\\-1\\1\end{bmatrix} \frac{1}{2}\begin{bmatrix}1\\1\\-j\\-j\end{bmatrix} \frac{1}{2}\begin{bmatrix}1\\j\\1\\j\end{bmatrix} \frac{1}{2}\begin{bmatrix}1\\j\\j\\1\end{bmatrix} \frac{1}{2}\begin{bmatrix}1\\j\\-1\\-j\end{bmatrix} \frac{1}{2}\begin{bmatrix}1\\j\\-j\\-1\end{bmatrix}$ |
| 8-15 | $\frac{1}{2}\begin{bmatrix}1\\-1\\1\\1\end{bmatrix} \frac{1}{2}\begin{bmatrix}1\\-1\\j\\-j\end{bmatrix} \frac{1}{2}\begin{bmatrix}1\\-1\\-1\\-1\end{bmatrix} \frac{1}{2}\begin{bmatrix}1\\-1\\-j\\j\end{bmatrix} \frac{1}{2}\begin{bmatrix}1\\-j\\1\\-j\end{bmatrix} \frac{1}{2}\begin{bmatrix}1\\-j\\j\\-1\end{bmatrix} \frac{1}{2}\begin{bmatrix}1\\-j\\-1\\j\end{bmatrix} \frac{1}{2}\begin{bmatrix}1\\-j\\-j\\1\end{bmatrix}$ |

TABLE 2

Correspondence between a PCI value and a precoding matrix when an RI value is 2, 3, or 4 Codebook

| Codebook Index (PCI) | RI = 2, 3, 4 |
|---|---|
| 0-3 | $\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$ |
| 4-7 | $\frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix}$ |
| 8-11 | $\frac{1}{2}\begin{bmatrix}1 & 0 & 0\\1 & 0 & 0\\0 & 1 & 0\\0 & 0 & 1\end{bmatrix} \quad \frac{1}{2}\begin{bmatrix}1 & 0 & 0\\-1 & 0 & 0\\0 & 1 & 0\\0 & 0 & 1\end{bmatrix} \quad \frac{1}{2}\begin{bmatrix}1 & 0 & 0\\0 & 1 & 0\\1 & 0 & 0\\0 & 0 & 1\end{bmatrix} \quad \frac{1}{2}\begin{bmatrix}1 & 0 & 0\\0 & 1 & 0\\-1 & 0 & 0\\0 & 0 & 1\end{bmatrix}$ |

TABLE 2-continued

Correspondence between a PCI value and a precoding matrix when an RI value is 2, 3, or 4 Codebook

| Codebook Index (PCI) | RI = 2, 3, 4 |
|---|---|
| 12-15 | $\frac{1}{2} \cdot \begin{pmatrix} 1 & 1 & 1 & 1 \\ e^{j\alpha} & -e^{j\alpha} & e^{j\alpha} & -e^{j\alpha} \\ e^{j\beta} & e^{j\beta} & -e^{j\beta} & -e^{j\beta} \\ e^{j\beta} & -e^{j\beta} & -e^{j\beta} & e^{j\theta} \end{pmatrix}$ $\quad \frac{1}{2} \cdot \begin{pmatrix} 1 & 1 & 1 & 1 \\ e^{j\alpha} & -e^{j\alpha} & e^{j\alpha} & -e^{j\alpha} \\ e^{j\beta} & e^{j\beta} & -e^{j\beta} & -e^{j\beta} \\ e^{j\beta} & -e^{j\beta} & -e^{j\beta} & e^{j\theta} \end{pmatrix}$ $\quad \frac{1}{2} \cdot \begin{pmatrix} 1 & 1 & 1 & 1 \\ e^{j\alpha} & -e^{j\alpha} & e^{j\alpha} & -e^{j\alpha} \\ e^{j\beta} & e^{j\beta} & -e^{j\beta} & -e^{j\beta} \\ e^{j\beta} & -e^{j\beta} & -e^{j\beta} & e^{j\theta} \end{pmatrix}$ $\quad \frac{1}{2} \cdot \begin{pmatrix} 1 & 1 & 1 & 1 \\ e^{j\alpha} & -e^{j\alpha} & e^{j\alpha} & -e^{j\alpha} \\ e^{j\beta} & e^{j\beta} & -e^{j\beta} & -e^{j\beta} \\ e^{j\beta} & -e^{j\beta} & -e^{j\beta} & e^{j\theta} \end{pmatrix}$ <br> $(\alpha, \beta, \theta) = \left(\frac{\pi}{4}, \frac{\pi}{4}, \frac{\pi}{4}\right)$ $\quad (\alpha, \beta, \theta) = \left(\frac{3\pi}{4}, \frac{5\pi}{4}, \frac{7\pi}{4}\right)$ $\quad (\alpha, \beta, \theta) = \left(\frac{5\pi}{4}, \frac{3\pi}{4}, \frac{1\pi}{4}\right)$ $\quad (\alpha, \beta, \theta) = \left(\frac{7\pi}{4}, \frac{5\pi}{4}, \frac{\pi}{4}\right)$ |

The PCI, RI, and CQI values comply with the following constraint condition, where the constraint condition includes:

any RI value corresponds to a PCI value set and a CQI value set; an RI value is uniquely determined according to the CQI value and PCI value. The constraint condition may be shown by Table 3.

TABLE 3

Correspondence between an RI value, a PCI value, and a CQI value

| RI | 1 | 2 | 3 | 4 |
|---|---|---|---|---|
| PCI | 0-15 | 0-7 | 8-11 | 12-15 |
| CQI | 0-30 | | 31-255 | |

The corresponding CQI value range in Type B is 0 to 30; the corresponding CQI value range in Type A is 0 to 255; in Type B, all PCI values correspond to the RI value 1; in Type A, when the CQI value range is 0 to 30, the corresponding RI value is 1; otherwise, when the CQI value is greater than 30 and the PCI value rang is 0 to 7, the corresponding RI value is 2; when the CQI value is greater than 30 and the PCI value rang is 8 to 11, the corresponding RI value is 3; when the CQI value is greater than 30 and the PCI value range is 12 to 15, the corresponding RI value is 4.

It should be noted that the constraint condition is not limited to the representation form in Table 3, and can be set according to a practical situation, which is not limited by the embodiment of the present invention.

102. Generate feedback information according to the CQI value and the PCI value, and send the feedback information to a base station according to the preset CQI feedback pattern.

The description about the preset CQI feedback pattern is the same as the description in step 101, and is not repeated in the embodiment of the present invention.

Figure 2:
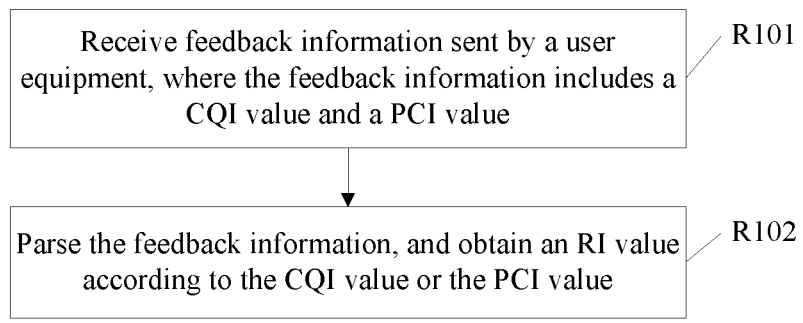
FIG. 2 is a flowchart of a method for processing user equipment feedback information according to Embodiment 1 of the present invention.

In addition, it should be noted that the generating feedback information according to the CQI value and the PCI value may be implemented, but not limited, in the following way, which is specifically includes:

converting each of the obtained CQI value and PCI value into a binary number; setting a binary number corresponding to the CQI value to be in the lower bits, setting a binary number corresponding to the PCI value to be in the higher bits; and combining the lower bits and the higher bits to generate a binary bit sequence, for example, the binary bit sequence may be:

$(a_0 \, a_1 \, a_2 \, a_3 \, a_4 \, a_5 \, a_6 \, a_7 \, a_8 \, a_9 \, a_{10} \, a_{11}) = (pci_0 \, pci_1 \, pci_2 \, pci_3 \, cqi_0 \, cqi_1 \, cqi_2 \, cqi_3 \, cqi_4 \, cqi_5 \, cqi_6 \, cqi_7)$ With respect to the above method at the user equipment side, the embodiment of the present invention further provides a method for receiving the feedback information at a base station side. As shown in FIG. 2, the method includes the following:

R101. Receive feedback information sent by a user equipment, where the feedback information includes a CQI value and a PCI value.

R102. Parse the feedback information, and obtain an RI value according to the CQI value or the PCI value.

The parsing the feedback information and obtaining an RI value according to the CQI value or the PCI value may be implemented in the following way, including:

obtaining the RI value according to the CQI value;

or obtaining the RI value according to the PCI value and the preset correspondence between a PCI value and an RI value.

With the method for transmitting and processing user equipment feedback information according to the embodiment of the present invention, a corresponding method for generating user equipment feedback information is set for either of RI values 3 and 4, and feedback is performed according to a preset feedback pattern, so that a user equipment is capable of transmitting feedback information with a maximum channel RI value of 4.

Embodiment 2

Figure 3:
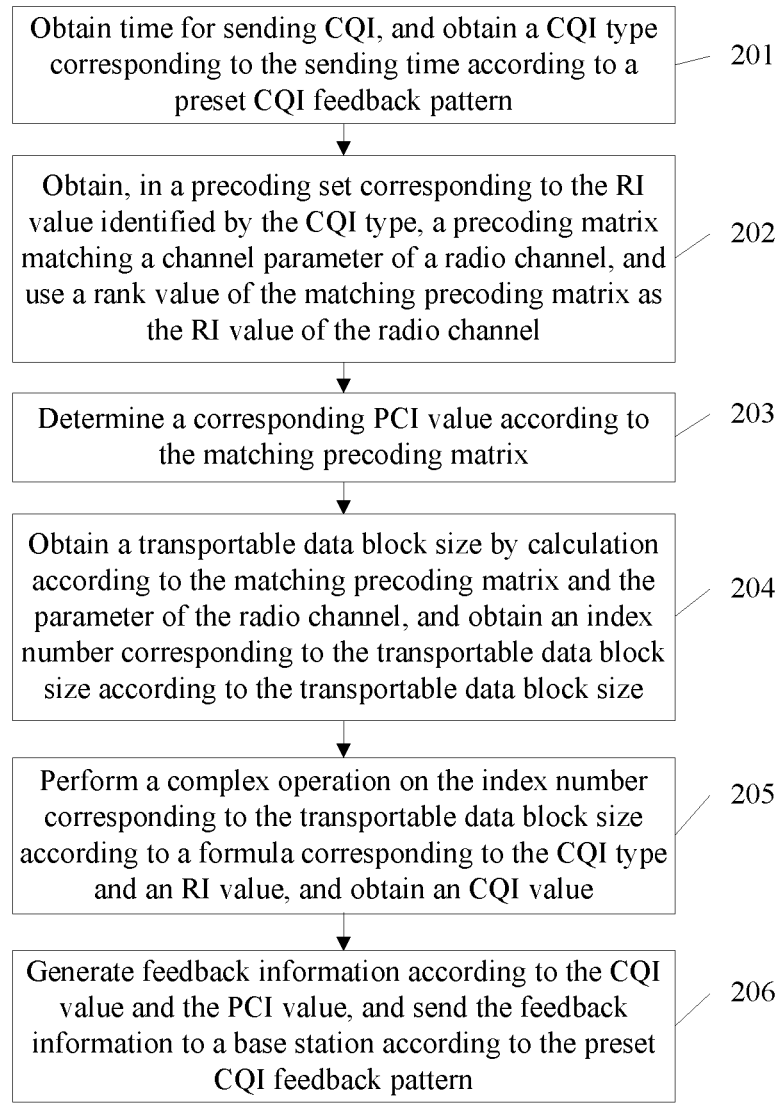
FIG. 3 is a flowchart of a method for transmitting user equipment feedback information according to Embodiment 2 of the present invention.

The embodiment of the present invention provides a method for transmitting user equipment feedback information. When a CQI type is Type A and Type B, where the RI value identified by Type A is any one of 1, 2, 3, and 4, and the RI value identified by Type B is 1, as shown in FIG. 3, the method is a method at a user equipment side and includes the following:

201. Obtain time for sending CQI, and obtain a CQI type corresponding to the sending time according to a preset CQI feedback pattern.

202. Obtain, in a precoding set corresponding to the RI value identified by the CQI type, a precoding matrix matching a channel parameter of a radio channel, and use a rank value of the matching precoding matrix as the RI value of the radio channel.

203. Determine a corresponding PCI value according to the matching precoding matrix.

The description about the correspondence between a precoding matrix and a PCI value is the same as the description in step 101, and is not repeated in the embodiment of the present invention.

The PCI, RI, and CQI values comply with the following constraint condition, where the constraint condition includes:

any RI value corresponds to a PCI value set and a CQI value set; an RI value is uniquely determined according to the CQI value and PCI value. The constraint condition may be shown in Table 4.

TABLE 4

Correspondence between an RI value, a PCI value, and a CQI value

| RI | 1 | 2 | 3 | 4 |
|---|---|---|---|---|
| PCI | 0-15 | 0-7 | 8-11 | 12-15 |
| CQI | 0-30 | | 31-255 | |

The corresponding CQI value range in Type B is 0 to 30; the corresponding CQI value range in Type A is 0 to 255; in Type B, all PCI values correspond to the RI value 1; in Type A, when the CQI value range is 0 to 30, the corresponding RI value is 1; otherwise, when the CQI value is greater than 30 and the PCI value rang is 0 to 7, the corresponding RI value is 2; when the CQI value is greater than 30 and the PCI value rang is 8 to 11, the corresponding RI value is 3; when the CQI value is greater than 30 and the PCI value range is 12 to 15, the corresponding RI value is 4.

It should be noted that the constraint condition is not limited to the representation form in Table 4, and can be set according to a practical situation, which is not limited by the embodiment of the present invention. Specifically, the constraint condition may be that the PCI value corresponding to any one of RI values 1, 2, 3, and 4 may fall within other value ranges, for example, the constraint condition may also be represented by Table 4a.

TABLE 4a

Correspondence between an RI value, a PCI value, and a CQI value

| RI | 1 | 2 | 3 | 4 |
|---|---|---|---|---|
| PCI | $0 - k_1$ | $0 - (k_2 - 1)$ | $(k_2) - (k_2 + k_3 - 1)$ | $(k_2 + k_3) - (k_2 + k_3 + k_4 - 1)$ |
| CQI | $0 - m1$ | | $(m1 + 1) - (m1 + m2 - 1)$ | | k1, k2, k3, and k4 may be configured specifically according to a practical situation, and the parameter in Table 4 is configured to be (k1, k2, k3, k4)=(16, 8, 4, 4). The parameter may also be configured to be other values, for example, (k1, k2, k3, k4)=(16, 16, 11, 5), where the form of the table corresponding to the parameter is shown in Table 4b.

TABLE 4b

Correspondence between an RI value, a PCI value, and a CQI value

| RI | 1 | 2 | 3 | 4 |
|---|---|---|---|---|
| PCI | 0-15 | 0-15 | 16-26 | 27-31 |
| CQI | 0-30 | | 31-255 | |

The corresponding CQI value range in Type B is 0 to 30; the corresponding CQI value range in Type A is 0 to 255; in Type B, all PCI values correspond to the RI value 1; in Type A, when the CQI value range is 0 to 30, the corresponding RI value is 1; otherwise, when the CQI value is greater than 30 and the PCI value rang is 0 to 7, the corresponding RI value is 2; when the CQI value is greater than 30 and the PCI value rang is 8 to 11, the corresponding RI value is 3; when the CQI value is greater than 30 and the PCI value range is 12 to 15, the corresponding RI value is 4.

204. Obtain a transportable data block size by calculation according to the matching precoding matrix and the parameter of the radio channel, and obtain an index corresponding to the transportable data block size according to the transportable data block size.

It should be noted that: when the RI value is 1, a transportable data block size is obtained by calculation according to the matching precoding matrix and the parameter of the radio channel, and an index corresponding to the transportable data block size is obtained according to the transportable data block size and is marked as CQIS; when the RI value is any one of 2, 3, and 4, two transportable data block sizes are obtained by calculation according to the matching precoding matrix and the parameter of the radio channel, and two indexs CQI1 and CQI2 corresponding to the two transportable data block sizes are obtained according to the two transportable data block sizes.

Those skilled in the art well know the specific implementation method for obtaining the transportable data block size by calculation according to the matching precoding matrix and the RI value and obtaining an index corresponding to the transportable data block size according to the transportable data block size, which is not repeated in the embodiment of the present invention.

205. Perform a complex operation on the index corresponding to the transportable data block size according to a formula and an RI that are corresponding to the CQI type, and obtain a CQI value.

The formula corresponding to the CQI type is:

$$CQI = \begin{cases} CQI_S & RI = 1 \\ 15 \times CQI_1 + CQI_2 + 31 & RI = 2, 3, 4 \end{cases}$$

where a $CQI_s$ value rang is 0 to 30, and $CQI_1$ and $CQI_2$ value rang are 0 to 14. The above formula is applicable to Type A and Type B.

It should be noted that the embodiment of the present invention does not limit the manner of setting the formula corresponding to the CQI type.

206. Generate feedback information according to the CQI value and the PCI value, and send the feedback information to a base station according to the preset CQI feedback pattern.

The implementation method for generating feedback information according to the CQI value and the PCI value is the same as the description in step 102, and is not repeated in the embodiment of the present invention.

The preset CQI feedback pattern is:

$$\underbrace{TypeA, \ldots, TypeA}_{N\_cqi\_typeA}, \overbrace{TypeB, \ldots, TypeB}^{M\_cqi} \underbrace{TypeA, \ldots, TypeA}_{N\_cqi\_typeA}, \overbrace{TypeB, \ldots, TypeB}^{M\_cqi};$$

where, M_cqi and N_cqi_Type A are parameters configured on a network side, and used to adjust the number of Type A and Type BType C, and the value range of N_cqi_Type A is 0 to M_cqi.

Figure 4:
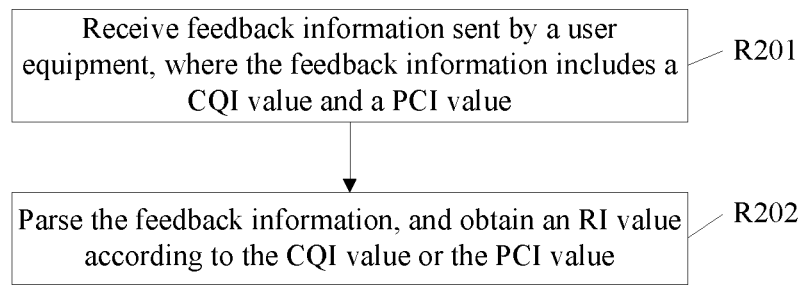
FIG. 4 is a flowchart of a method for processing user equipment feedback information according to Embodiment 2 of the present invention.

With respect to the above method at the user equipment side, the embodiment of the present invention further provides a method for receiving the feedback information at a base station side. As shown in FIG. 4, the method includes the following:

R201. Receive feedback information sent by a user equipment, where the feedback information includes a CQI value and a PCI value.

R202. Parse the feedback information, and obtain an RI value according to the CQI value or the PCI value.

The parsing the feedback information and obtaining an RI value according to the CQI value or the PCI value may be implemented in the following way, including:

obtaining the RI value according to the CQI value;

or obtaining the RI value according to the PCI value and the preset correspondence between a PCI value and an RI value.

With the method for transmitting and processing user equipment feedback information according to the embodiment of the present invention, a corresponding method for generating user equipment feedback information is set for either of RI values 3 and 4, and feedback is performed according to a preset feedback pattern, so that a user equipment is capable of transmitting feedback information with a maximum channel RI value of 4.

In addition, information of an RI value is carried in PCI information, so that the size of user equipment feedback information is not changed when the RI value is either of 3 and 4, thereby saving transmission bandwidth of feedback information.

In addition, in this embodiment, a corresponding feedback pattern is set for a CQI type, so that a base station can accurately receive the user equipment feedback information.

Embodiment 3

Figure 5:
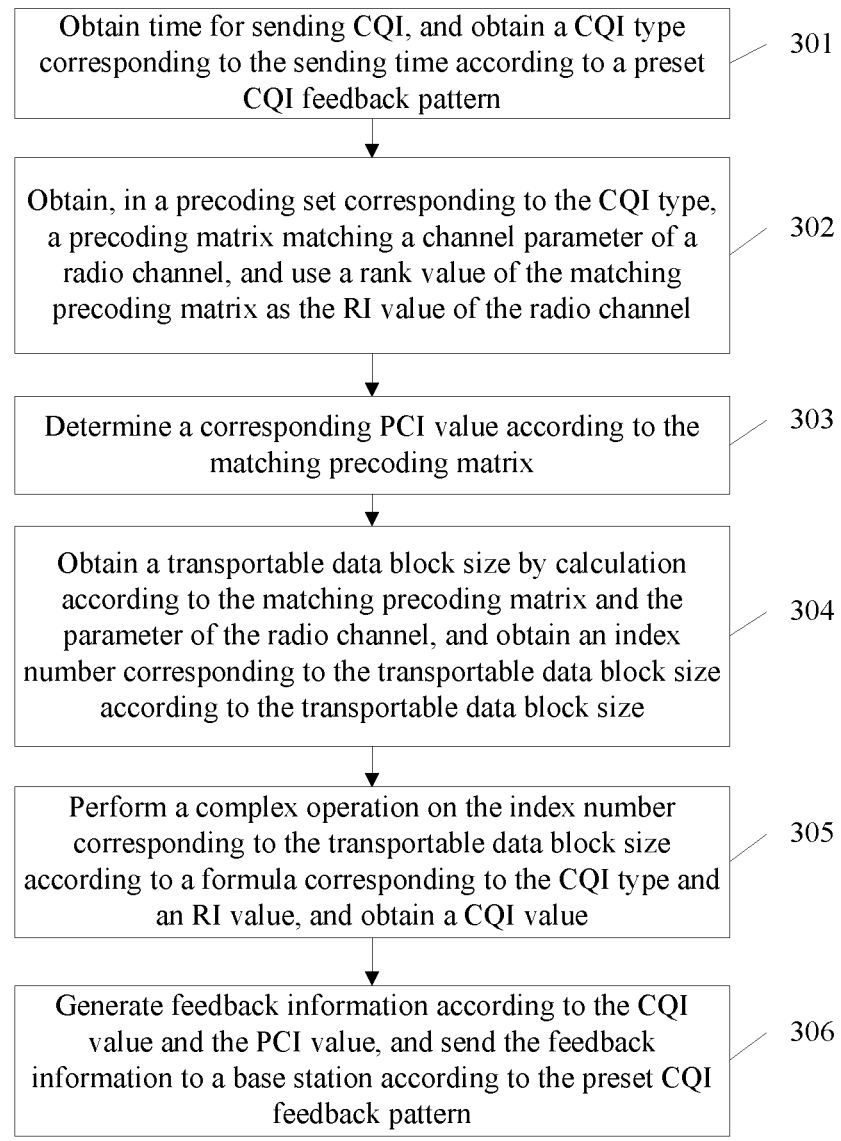
FIG. 5 is a flowchart of a method for transmitting user equipment feedback information according to Embodiment 3 of the present invention.

The embodiment of the present invention provides a method for transmitting user equipment feedback information. When CQI types are three CQI types Type A, Type B and Type C, where the RI values identified by Type A are 1 and 2, the RI value identified by Type B is 1, and the RI value identified by Type C is either of 3 and 4, as shown in FIG. 5, the method is a method at a user equipment side and includes the following:

301. Obtain time for sending CQI, and obtain a CQI type corresponding to the sending time according to a preset CQI feedback pattern.

302. Obtain, in a precoding set corresponding to the RI value identified by the CQI type, a precoding matrix matching a channel parameter of a radio channel, and use a rank value of the matching precoding matrix as the RI value of the radio channel.

303. Determine a corresponding PCI value according to the matching precoding matrix.

The determining a corresponding PCI value according to the matching precoding matrix may be implemented in the following way, which specifically includes:

determining the corresponding PCI value according to the correspondence between a precoding matrix and a PCI value, where the correspondence between a precoding matrix and a PCI value includes: one precoding matrix corresponds to one PCI value. The PCI value may not carry information of any RI value, and may be directly set to be represented by a 4-bit binary number. Those skilled in the art well know the specific setting method, and details are not repeated in the embodiment of the present invention.

304. Obtain a transportable data block size by calculation according to the matching precoding matrix and the parameter of the radio channel, and obtain an index corresponding to the transportable data block size according to the transportable data block size.

The description about step 304 is the same as the description in step 204, and is not repeated in the embodiment of the present invention.

305. Perform a complex operation on the index corresponding to the transportable data block size according to a formula and an RI value that corresponding to the CQI type and an RI value, and obtain a CQI value.

The formula corresponding to the CQI type is:

The formula corresponding to Type C may be:

$$CQI = \begin{cases} 11 \times CQI_1 + CQI_2 & RI = 3 \\ 11 \times CQI_1 + CQI_2 + 121 & RI = 4 \end{cases}$$

where $CQI_1$ and $CQI_2$ value ranges are 0 to 10.

The formula corresponding to Type C may also be:

$$CQI = \begin{cases} 15 \times CQI_1 + CQI_2 & RI = 3 \\ 15 \times CQI_1 + CQI_2 + 225 & RI = 4 \end{cases}$$

where $CQI_1$ and $CQI_2$ value ranges are 0 to 15.

It should be noted that the formulas corresponding to Type A and Type B may be set according to the prior art, or may be set freely according to a practical requirement, and the present invention is not limited thereto.

It should be noted that the embodiment of the present invention does not limit the manner of setting the formula corresponding to the CQI type.

306. Generate feedback information according to the CQI value and the PCI value, and send the feedback information to a base station according to the preset CQI feedback pattern.

The implementation method for generating feedback information according to the CQI value and the PCI value is the same as the related description in step 102, and is not repeated in the embodiment of the present invention.

The preset CQI feedback pattern is:

$$\underbrace{\overbrace{\underbrace{TypeC, \ldots, TypeC}_{N\_cqi\_typeC}, \underbrace{TypeA, \ldots, TypeA}_{N\_cqi\_typeA}, TypeB, \ldots, TypeB}^{M\_cqi}}$$

where, M_cqi, N_cqi_Type A, and N_cqi_Type C are parameters configured on a network side, and used to adjust the number of Type A, Type B, and Type C, the value ranges of N_cqi_Type A and N_cqi_Type C are 0 to M_cqi, and a sum of N_cqi_Type A and N_cqi_Type C is smaller than or equal to M_cqi.

Figure 6:
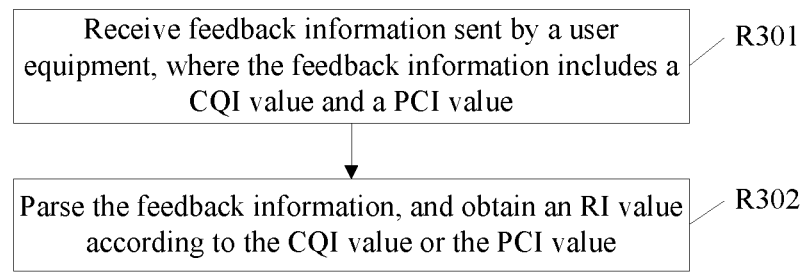
FIG. 6 is a flowchart of a method for processing user equipment feedback information according to Embodiment 3 of the present invention.

With respect to the above method at the user equipment side, the embodiment of the present invention further provides a method for receiving the feedback information at a base station side. As shown in FIG. 6, the method includes the following:

R301. Receive feedback information sent by a user equipment, where the feedback information includes a CQI value and a PCI value.

R302. Parse the feedback information, and obtain an RI value according to the CQI value or the PCI value.

The parsing the feedback information and obtaining an RI value according to the CQI value or the PCI value may be implemented in the following way, including:

obtaining the RI value according to the CQI value;

or obtaining the RI value according to the PCI value and the preset correspondence between a PCI value and an RI value.

With the method for transmitting and processing user equipment feedback information according to the embodiment of the present invention, a corresponding method for generating user equipment feedback information is set for either of RI values 3 and 4, and feedback is performed according to the preset feedback pattern, so that a user equipment is capable of transmitting feedback information with a maximum channel RI value of 4.

In addition, in this embodiment, information of an RI value is carried in CQI information, so that the size of user equipment feedback information is not changed when the RI value is either of 3 and 4, thereby saving transmission bandwidth of feedback information.

In addition, in this embodiment, a corresponding feedback pattern is set for a CQI type, so that a base station can accurately receive the user equipment feedback information.

Embodiment 3a

Figure 5A:
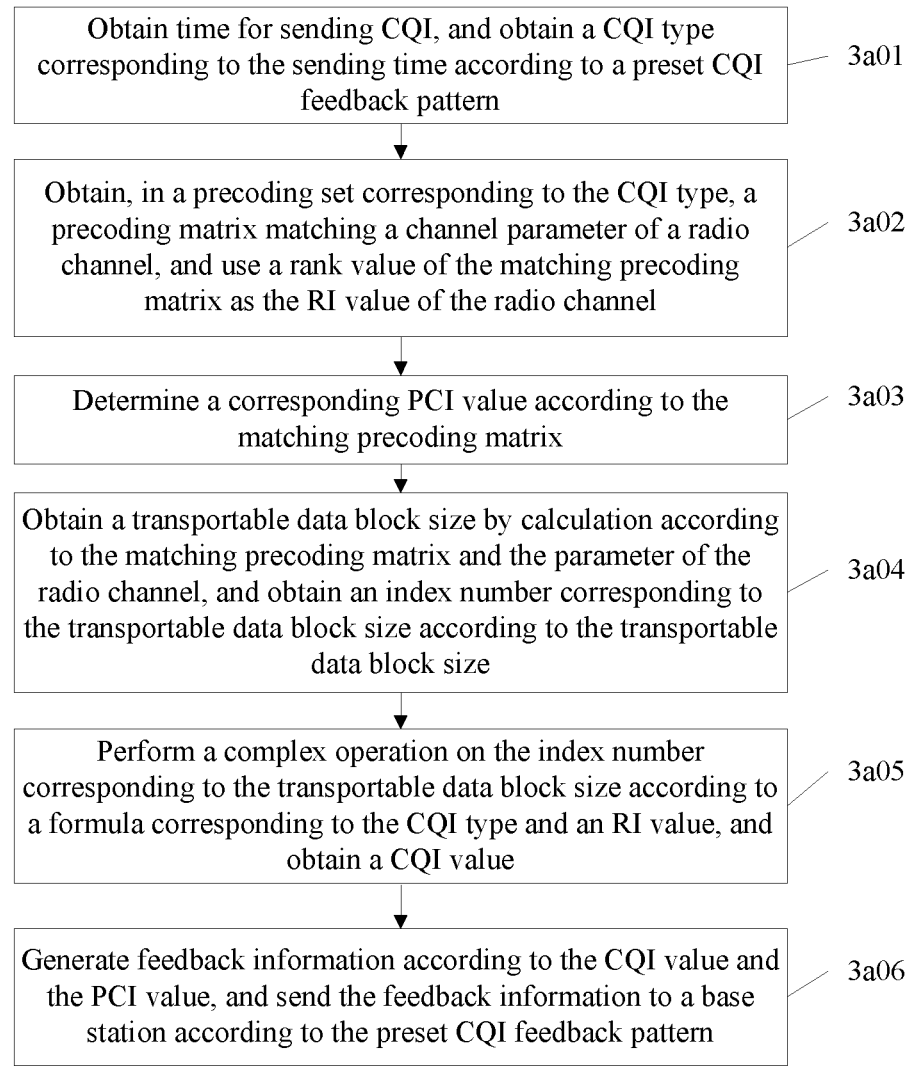
FIG. 5a is a flowchart of a method for transmitting user equipment feedback information according to Embodiment 3a of the present invention.

The embodiment of the present invention provides a method for transmitting user equipment feedback information. When CQI types are three CQI types Type A, Type B and Type C, where the RI value identified by Type A is either of 1 and 2, the RI value identified by Type B is 1, and the RI value identified by Type C is any one of 1, 3, and 4, as shown in FIG. 5a, the method is a method at a user equipment side and includes the following:

3a01. Obtain time for sending CQI, and obtain a CQI type corresponding to the sending time according to a preset CQI feedback pattern.

3a02. Obtain, in a precoding set corresponding to the RI value identified by the CQI type, a precoding matrix matching a channel parameter of a radio channel, and use a rank value of the matching precoding matrix as the RI value of the radio channel.

3a03. Determine a corresponding PCI value according to the matching precoding matrix.

The determining a corresponding PCI value according to the matching precoding matrix may be implemented in the following way, which specifically includes:

determining the corresponding PCI value according to the correspondence between a precoding matrix and a PCI value, where the correspondence between a precoding matrix and a PCI value includes: one precoding matrix corresponds to one PCI value. The PCI value may not carry information of any RI value, and may be directly set to be represented by a 4-bit binary number. Those skilled in the art well know the specific setting method, and details are not repeated in the present invention.

3a04. Obtain a transportable data block size by calculation according to the matching precoding matrix and the parameter of the radio channel, and obtain an index corresponding to the transportable data block size according to the transportable data block size.

The description about step 3a04 is the same as the description in step 204, and is not repeated in the embodiment of the present invention.

3a05. Perform a complex operation on the index corresponding to the transportable data block size according to a formula and an RI value that are corresponding to the CQI type, and obtain a CQI value.

The formula corresponding to the CQI type is:

The formula corresponding to Type C may be:

$$CQI = \begin{cases} CQI_S & RI = 1 \\ 15 \times CQI_1 + CQI_2 + 31 & RI = 3, 4 \end{cases}$$

It should be noted that when the CQI of Type C is transmitted, additional 1-bit RIb information is required to distinguish rank 3 and rank 4: When a CQI value is greater than 30 and an RIb value is 0, it indicates that RI is 3; when an RIb value is 1, it indicates that RI is 4, where the RIb value may be interchanged. Or equivalently, Type C may be set by using the setting method in Embodiment 1 or Embodiment 2, for example,

TABLE 5

Correspondence between an RI value, a PCI value, and a CQI value

| RI | 1 | 3 | 4 |
|---|---|---|---|
| PCI | 0-15 | 0-15 | 16-31 |
| CQI | 0-30 | 31-255 | |

The corresponding CQI value range in Type C is 0 to 255. When the CQI value range is 0 to 30, the corresponding RI value is 1; otherwise, when the CQI value is greater than 30 and the PCI value rang is 0 to 15, the corresponding RI value is 3; when the CQI value is greater than 30 and the PCI value range is 16 to 31, the corresponding RI value is 4.

The formulas corresponding to Type A and Type B may be set according to the prior art, or may be set freely according to a practical requirement, and the embodiment of the present invention is not limited thereto.

It should be noted that the embodiment of the present invention does not limit the manner of setting the formula corresponding to the CQI type.

3a06. Generate feedback information according to the CQI value and the PCI value, and send the feedback information to a base station according to the preset CQI feedback pattern.

The implementation method for generating feedback information according to the CQI value and the PCI value is the same as the description in step 102, and is not repeated in the embodiment of the present invention.

The preset CQI feedback pattern is:

$$\underbrace{TypeC, \ldots, TypeC,}_{N\_cqi\_typeC} \underbrace{TypeA, \ldots, TypeA,}_{N\_cqi\_typeA} \overbrace{TypeB, \ldots, TypeB}^{M\_cqi}$$

where, M_cqi, N_cqi_Type A, and N_cqi_Type C are parameters configured on a network side, and used to adjust the number of Type A, Type B, and Type C, the value ranges of N_cqi_Type A and N_cqi_Type C are 0 to M_cqi, and a sum of N_cqi_Type A, N_cqi_Type B, and N_cqi_Type C is smaller than or equal to M_cqi.

Figure 6A:
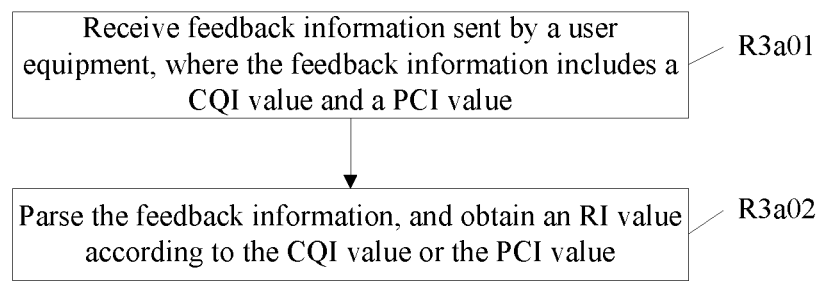
FIG. 6a is a flowchart of a method for processing user equipment feedback information according to Embodiment 3a of the present invention.

With respect to the above method at the user equipment side, the embodiment of the present invention further provides a method for receiving the feedback information at a base station side. As shown in FIG. 6a, the method includes the following:

R3a01. Receive feedback information sent by a user equipment, where the feedback information includes a CQI value and a PCI value.

R3a02. Parse the feedback information, and obtain an RI value according to the CQI value or the PCI value.

The parsing the feedback information and obtaining an RI value according to the CQI value or the PCI value may be implemented in the following way, including:

obtaining the RI value according to the CQI value;

or obtaining the RI value according to the PCI value and the preset correspondence between a PCI value and an RI value.

With the method for transmitting and processing user equipment feedback information according to the embodiment of the present invention, a corresponding method for generating user equipment feedback information is set for either of RI values 3 and 4, and feedback is performed according to a preset feedback pattern, so that a user equipment is capable of transmitting feedback information with a maximum channel RI value of 4.

In addition, in this embodiment, information of an RI value is carried in CQI information, so that the size of user equipment feedback information is not changed when the RI value is 3 or 4, thereby saving transmission bandwidth of feedback information.

In addition, in this embodiment, a corresponding feedback pattern is set for a CQI type, so that a base station can accurately receive the user equipment feedback information.

Embodiment 4

Figure 7:
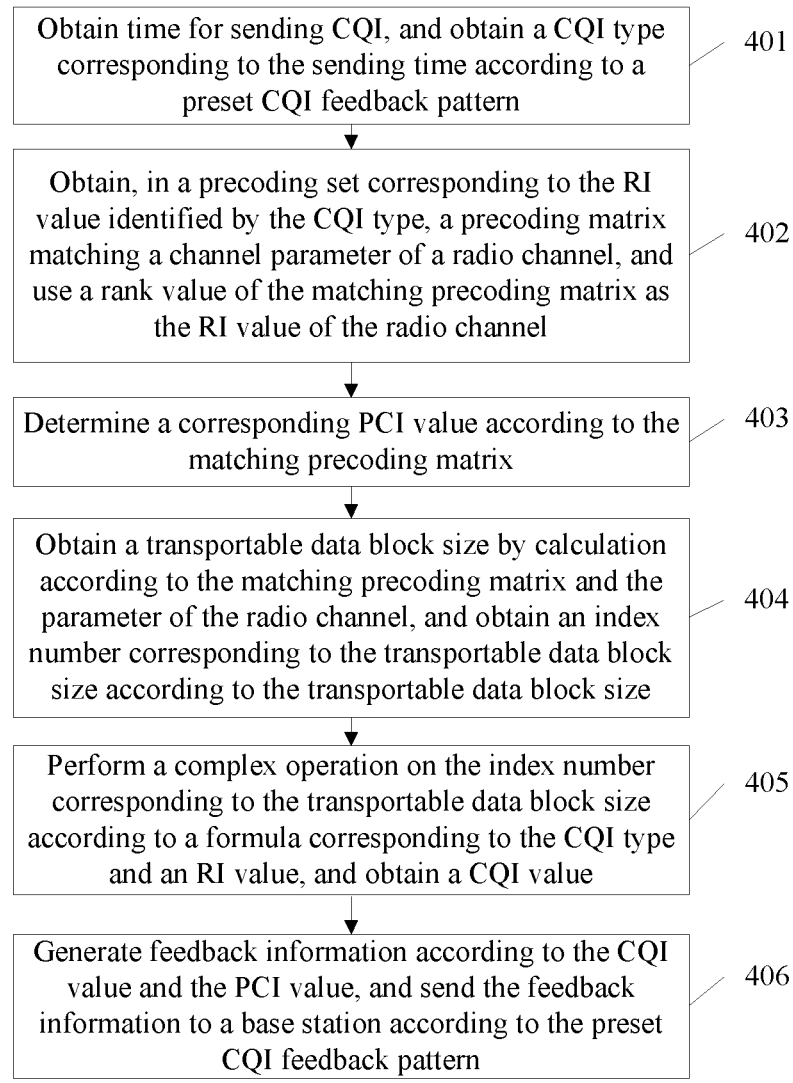
FIG. 7 is a flowchart of a method for transmitting user equipment feedback information according to Embodiment 4 of the present invention.

The embodiment of the present invention provides a method for transmitting user equipment feedback information. When CQI types are four CQI types Type A, Type B, Type C, and Type D, where the RI value identified by Type A is either of 1 and 2, the RI value identified by Type B is 1, the RI value identified by Type C is any one of 1, 2, and 3, and the RI value identified by Type D is any one of 1, 2, 3, and 4; or the RI value identified by Type A is either of 1 and 2, the RI value identified by Type B is 1, the RI value identified by Type C is either of 1 and 3, and the RI value identified by Type D is either of 1 and 4, as shown in FIG. 7, the method is a method at a user equipment side and includes the following:

401. Obtain time for sending CQI, and obtain a CQI type corresponding to the sending time according to a preset CQI feedback pattern.

402. Obtain, in a precoding set corresponding to the RI value identified by the CQI type, a precoding matrix matching a channel parameter of a radio channel, and use a rank value of the matching precoding matrix as the RI value of the radio channel.

403. Determine a corresponding PCI value according to the matching precoding matrix.

The implementation method for determining a corresponding PCI value according to the matching precoding matrix is the same as the description in step 303, and is not repeated in the embodiment of the present invention.

404. Obtain a transportable data block size by calculation according to the matching precoding matrix and the parameter of the radio channel, and obtain an index corresponding to the transportable data block size according to the transportable data block size.

The description about step 404 is the same as the description in step 204, and is not repeated in the embodiment of the present invention.

405. Perform a complex operation on the index corresponding to the transportable data block size according to a formula and an RI value that are corresponding to the CQI type, and obtain a CQI value.

The formula corresponding to the CQI type is:
The formula corresponding to Type C is:

$$CQI = \begin{cases} CQI_S & RI = 1 \\ 15 \times CQI_1 + CQI_2 + 31 & RI = 2 \\ 15 \times CQI_1 + CQI_2 + 256 & RI = 3 \end{cases}$$

where the $CQI_s$ value rang is 0 to 30, and the $CQI_1$ and $CQI_2$ value ranges are 0 to 14.

The formula corresponding to Type D is:

$$CQI = \begin{cases} CQI_S & RI = 1 \\ 15 \times CQI_1 + CQI_2 + 31 & RI = 2 \\ 15 \times CQI_1 + CQI_2 + 256 & RI = 3 \\ 15 \times CQI_1 + CQI_2 + 481 & RI = 4 \end{cases}$$

where the $CQI_s$ value rang is 0 to 30, and the $CQI_1$ and $CQI_2$ value ranges are 0 to 14.

Or the formula corresponding to Type C is:

$$CQI = \begin{cases} CQI_S & RI = 1 \\ 15 \times CQI_1 + CQI_2 + 31 & RI = 3 \end{cases}$$

where the $CQI_s$ value range is 0 to 30, and the $CQI_1$ and $CQI_2$ value ranges are 0 to 14.

The formula corresponding to Type D is:

$$CQI = \begin{cases} CQI_S & RI = 1 \\ 15 \times CQI_1 + CQI_2 + 31 & RI = 4 \end{cases}$$

where the $CQI_s$ value range is 0 to 30, and the $CQI_1$ and $CQI_2$ value ranges are 0 to 14.

It should be noted that the formulas corresponding to Type A and Type B may be set according to the prior art, or may be set freely according to a practical requirement, and the embodiment of the present invention is not limited thereto.

It should be noted that the embodiment of the present invention does not limit the manner of setting the formula corresponding to the CQI type.

406. Generate feedback information according to the CQI value and the PCI value, and send the feedback information to a base station according to the preset CQI feedback pattern.

The implementation method for generating feedback information according to the CQI value and the PCI value is the same as the description in step 102, and is not repeated in the embodiment of the present invention.

The preset CQI feedback pattern is:

$$\underbrace{\overbrace{TypeD, \ldots, TypeD}^{N\_cqi\_typeD}, \overbrace{TypeC, \ldots, TypeC}^{N\_cqi\_typeC}, \overbrace{TypeA, \ldots, TypeA}^{N\_cqi\_typeA}, TypeB, \ldots, TypeB}_{M\_cqi};$$

where, M_cqi, N_cqi_Type A, N_cqi_Type C, and N_cqi_Type D are parameters configured on a network side, and used to adjust the number of Type A, Type B, Type C, and Type D, and the value ranges of N_cqi_Type A, N_cqi_Type C, and N_cqi_Type D are 0 to M_cqi, and a sum of N_cqi_Type A, N_cqi_Type C, and N_cqi_Type D is smaller than or equal to M_cqi.

It should be noted that if N_cqi_Type D=N_cqi_Type C=N_cqi_Type A=1 or other constants the CQI feedback pattern may be converted into the following pattern:

Type D, Type C, Type A, Type B, Type D, Type C, Type A, Type B, . . . .

In addition, the following limitation exists: in Type D, only the CQI value with rank 4 is fed back; in Type C, only the CQI value with rank 3 is fed back; in Type A, only the value with rank 2 is fed back; and in Type B, only the value with rank 1 is fed back. When feedback information is transmitted in this form, a base station may directly obtain RI information according to the receiving time after receiving it.

Figure 8:
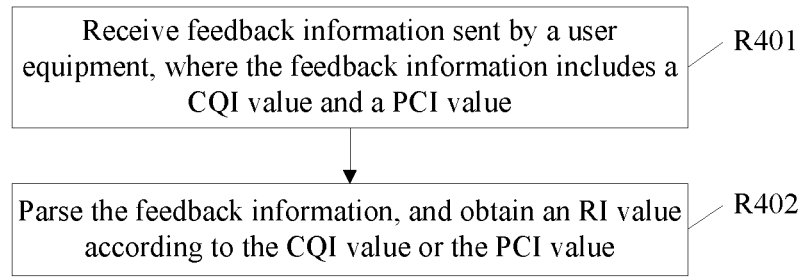
FIG. 8 is a flowchart of a method for processing user equipment feedback information according to Embodiment 4 of the present invention.

With respect to the above method at the user equipment side, the embodiment of the present invention further provides a method for receiving the feedback information at a base station side. As shown in FIG. 8, the method includes the following:

R401. Receive feedback information sent by a user equipment, where the feedback information includes a CQI value and a PCI value.

R402. Parse the feedback information, and obtain an RI value according to the CQI value or the PCI value.

The parsing the feedback information and obtaining an RI value according to the CQI value or the PCI value may be implemented in the following way, including:

obtaining the RI value according to the CQI value;

or obtaining the RI value according to the PCI value and the preset correspondence between a PCI value and an RI value.

With the method for transmitting and processing user equipment feedback information according to the embodiment of the present invention, a corresponding method for generating user equipment feedback information is set for either of RI values 3 and 4, and feedback is performed according to a preset feedback pattern, so that a user equipment is capable of transmitting feedback information with a maximum channel RI value of 4.

In addition, in this embodiment, information of an RI value is carried in CQI information, so that the size of user equipment feedback information is not changed when the RI value is either of 3 and 4, thereby saving transmission bandwidth of feedback information.

In addition, in this embodiment, a corresponding feedback pattern is set for a CQI type, so that a base station can accurately receive the user equipment feedback information.

Embodiment 4a

Figure 7A:
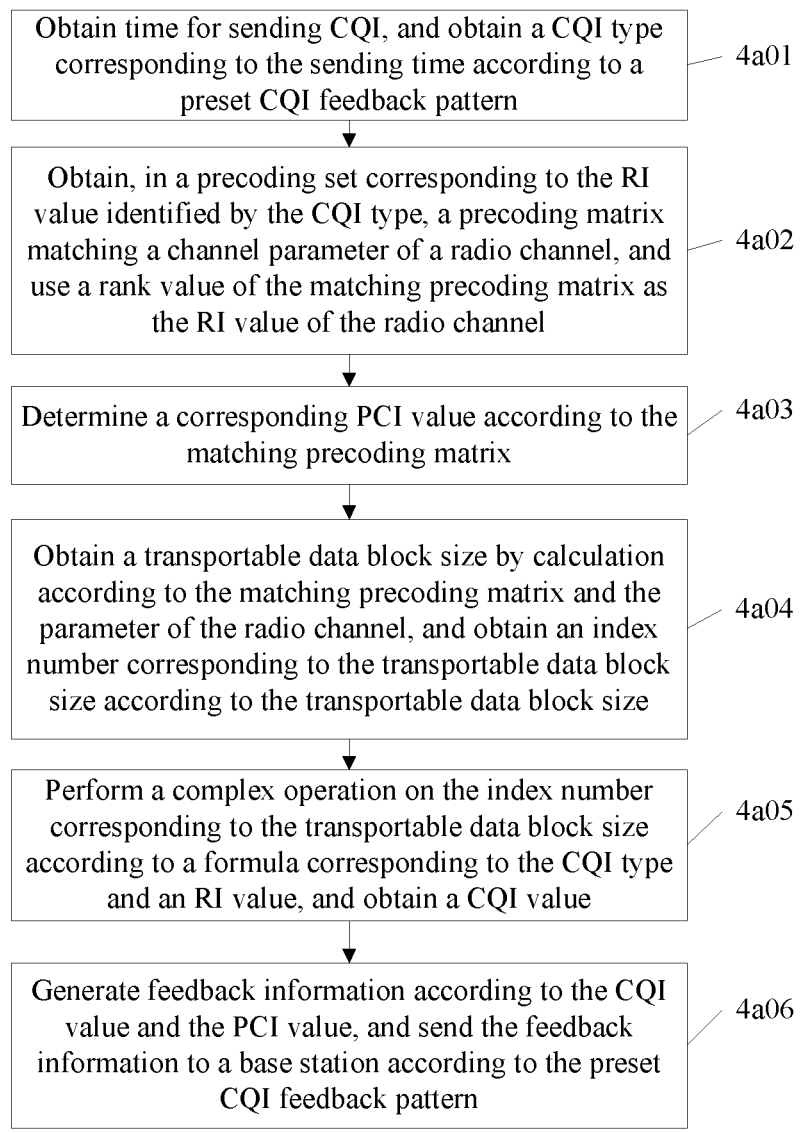
FIG. 7a is a flowchart of a method for transmitting user equipment feedback information according to Embodiment 4a of the present invention.

The embodiment of the present invention provides a method for transmitting user equipment feedback information. When CQI types are four CQI types Type A, Type B, Type C and Type D, where the RI value identified by Type A is either of 1 and 2, the RI value identified by Type B is 1, the RI value identified by Type C is any one of 1, 2, and 3, and the RI value identified by Type D is any one of 1, 2, 3, and 4, as shown in FIG. 7a, the method is a method at a user equipment side and includes the following:

4a01. Obtain time for sending CQI, and obtain a CQI type corresponding to the sending time according to a preset CQI feedback pattern.

4a02. Obtain, in a precoding set corresponding to the RI value identified by the CQI type, a precoding matrix matching a channel parameter of a radio channel, and use a rank value of the matching precoding matrix as the RI value of the radio channel.

4a03. Determine a corresponding PCI value according to the matching precoding matrix.

The implementation method for determining a corresponding PCI value according to the matching precoding matrix is the same as the description in step 303, and is not repeated in the embodiment of the present invention.

4a04. Obtain a transportable data block size by calculation according to the matching precoding matrix and the parameter of the radio channel, and obtain an index corresponding to the transportable data block size according to the transportable data block size.

The description about step 4a04 is the same as the description in step 204, and is not repeated in the embodiment of the present invention.

4a05. Perform a complex operation on the index corresponding to the transportable data block size according to a formula and an RI value that are corresponding to the CQI type, and obtain a CQI value.

The formula corresponding to the CQI type is:

The formula corresponding to Type C is:

$$CQI = \begin{cases} CQI_S & RI = 1 \\ 15 \times CQI_1 + CQI_2 + 31 & RI = 2, 3 \end{cases}$$

where the $CQI_s$ value range is 0 to 30, and the $CQI_1$ and $CQI_2$ value ranges are 0 to 14. Rank 2 and rank 3 are further distinguished through additional 1-bit RIb information. When the CQI value range is greater than 30 and an RIb value is 0, it indicates that RI is 2; when an RIb value is 1, it indicates that RI is 3, where the RIb value may be interchanged. Or equivalently, rank 2 and rank 3 may be further distinguished through the PCI value, as shown in the following example.

TABLE 6

Correspondence between an RI value, a PCI value, and a CQI value

| RI | 1 | 2 | 3 |
|---|---|---|---|
| PCI | 0-15 | 0-15 | 16-31 |
| CQI | 0-30 | 31-255 | |

The corresponding CQI value range in Type C is 0 to 255. When the CQI value rang is 0 to 30, the corresponding RI value is 1; otherwise, when the CQI value is greater than 30 and the PCI value range is 0 to 15, the corresponding RI value is 2; when the CQI value is greater than 30 and the PCI value range is 16 to 31, the corresponding RI value is 3.

The formula corresponding to Type D is:

$$CQI = \begin{cases} CQI_S & RI = 1 \\ 15 \times CQI_1 + CQI_2 + 31 & RI = 2, 3, 4 \end{cases}$$

where the CQIs value range is 0 to 30, and the CQI1 and CQI2 value ranges are 0 to 14. Rank information may be further distinguished through the PCI value, as shown in the following example.

TABLE 6

Correspondence between an RI value, a PCI value, and a CQI value

| RI | 1 | 2 | 3 | 4 |
|---|---|---|---|---|
| PCI | 0-15 | 0-15 | 16-26 | 27-31 |
| CQI | 0-30 | | 31-255 | |

In Type D, when the CQI value range is 0 to 30, the corresponding RI value is 1; otherwise, when the CQI value is greater than 30 and the PCI value range is 0 to 15, the corresponding RI value is 2; when the CQI value is greater than 30 and the PCI value range is 16 to 26, the corresponding RI value is 3; when the CQI value is greater than 30 and the PCI value range is 27 to 31, the corresponding RI value is 4.

It should be noted that the value ranges in Table 6 may be replaced by other ranges, which are not limited by this solution.

Or the formula corresponding to Type D is:

$$CQI = \begin{cases} CQI_S & RI = 1 \\ 15 \times CQI_1 + CQI_2 + 31 & RI = 3, 4 \end{cases}$$

It should be noted that when the CQI of Type D is transmitted, additional 1-bit RIb information is required to distinguish rank 3 and rank 4: When the CQI value is greater than 30 and the RIb value is 0, it indicates that the RI is 3; when the RIb value is 1, it indicates that the RI is 4, where the RIb value may be interchanged. The CQIs value rang is 0 to 30, and the CQI1 and CQI2 values rang are 0 to 14. Rank information may be further distinguished through the PCI value, as shown in the following example.

TABLE 7

Correspondence between an RI value, a PCI value, and a CQI value

| RI | 1 | 3 | 4 |
|---|---|---|---|
| PCI | 0-15 | 0-15 | 16-31 |
| CQI | 0-30 | 31-255 | |

In Type D, when the CQI value range is 0 to 30, the corresponding RI value is 1; otherwise, when the CQI value is greater than 30 and the PCI value range is 0 to 15, the corresponding RI value is 3; when the CQI value is greater than 30 and the PCI value range is 16 to 31, the corresponding RI value is 4.

It should be noted that the formulas corresponding to Type A and Type B may be set according to the prior art, or may be set freely according to a practical requirement, and the embodiment of the present invention is not limited thereto.

It should be noted that the embodiment of the present invention does not limit the manner of setting the formula corresponding to the CQI type.

4a06. Generate feedback information according to the CQI value and the PCI value, and send the feedback information to a base station according to the preset CQI feedback pattern.

The implementation method for generating feedback information according to the CQI value and the PCI value is the same as the description in step 102, and is not repeated in the embodiment of the present invention.

The preset CQI feedback pattern is:

$$\underbrace{\overbrace{TypeD, \ldots, TypeD}^{N\_cqi\_typeD}, \overbrace{TypeC, \ldots, TypeC}^{N\_cqi\_typeC}, \overbrace{TypeA, \ldots, TypeA}^{N\_cqi\_typeA}, TypeB, \ldots, TypeB}_{M\_cqi};$$

where, M_cqi, N_cqi_Type A, N_cqi_Type C, and N_cqi_Type D are parameters configured on a network side, and used to adjust the number of Type A, Type B, Type C, and Type D, and the value ranges of N_cqi_Type A, N_cqi_Type C, and N_cqi_Type D are 0 to M_cqi, and a sum of N_cqi_Type A, N_cqi_Type C, and N_cqi_Type D is smaller than or equal to M_cqi.

With respect to the above method at the user equipment side, the embodiment of the present invention further provides a method for receiving the feedback information at a base station side, as shown in FIG. 8, where the method is similar to the method in Embodiment 4 and is not repeated herein.

Embodiment 5

Figure 9:
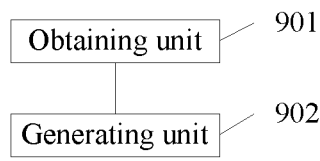
FIG. 9 is a composition block diagram of an apparatus for transmitting user equipment feedback information according to Embodiment 5 of the present invention.

The embodiment of the present invention provides an apparatus for transmitting user equipment feedback information. As shown in FIG. 9, the apparatus includes an obtaining unit 901 and a generating unit 902.

The obtaining unit 901 is configured to obtain rank information RI of a radio channel, a corresponding channel quality indication information CQI value, and a precoding control information PCI value, where an RI value is any one of 1, 2, 3, and 4.

The generating unit 902 is configured to generate feedback information according to the CQI value and the PCI value obtained by the obtaining unit 901, and send the feedback information to a base station according to a CQI feedback pattern.

Figure 10:
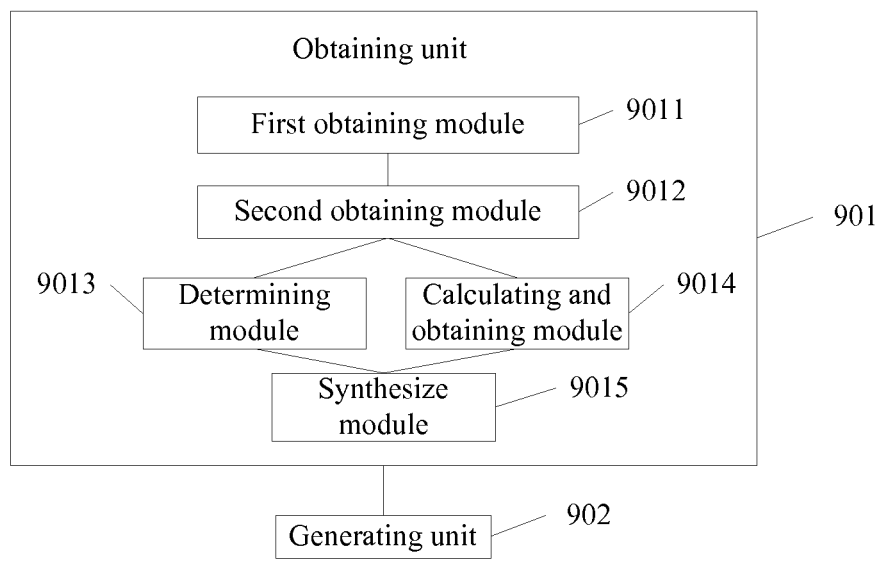
FIG. 10 is a composition block diagram of another apparatus for transmitting user equipment feedback information according to Embodiment 5 of the present invention.

Further, as shown in FIG. 10, the obtaining unit 901 includes: a first obtaining module 9011, a second obtaining module 9012, a determining module 9013, a calculating and obtaining module 9014, and a synthesize module 9015.

The first obtaining module 9011 is configured to obtain time for sending CQI, and obtain a CQI type corresponding to the sending time according to the CQI feedback pattern, where the CQI type identifies the RI value.

The second obtaining module 9012 is configured to obtain, in a precoding set corresponding to the RI value identified by the CQI type obtained by the first obtaining module 9011, a precoding matrix matching a channel parameter of a radio channel, and use a rank value of the matching precoding matrix as the RI value of the radio channel.

The determining module 9013 is configured to determine a corresponding PCI value according to the matching precoding matrix obtained by the second obtaining module 9012. The PCI, RI, and CQI values comply with the following constraint condition, where the constraint condition includes: any RI value corresponds to a PCI value set and a CQI value set; an RI value is uniquely determined according to the CQI value and PCI value.

The calculating and obtaining module 9014 is configured to obtain a transportable data block size by calculation according to the matching precoding matrix obtained by the second obtaining module 9012 and the parameter of the radio channel, and obtain an index corresponding to the transportable data block size according to the transportable data block size.

The synthesize module 9015 is configured to perform, according to a formula and an RI value that are corresponding to the CQI type, a complex operation on the index corresponding to the transportable data block size obtained by the calculating and obtaining module 9014, and obtain a CQI value.

The CQI types include two CQI types Type A and Type B, or three CQI types Type A, Type B, and Type C, or four CQI types Type A, Type B, Type C, and Type D.

When there are two CQI types Type A and Type B, the RI value identified by the CQI type is:

the RI value identified by Type A is any one of 1, 2, 3, and 4, and the RI value identified by Type B is 1.

When there are three CQI types Type A, Type B, and Type C, the RI value identified by the CQI type is:

the RI value identified by Type A is either of 1 and 2, the RI value identified by Type B is 1, and the RI value identified by Type C is either of 3 and 4; or the RI value identified by Type A is either of 1 and 2, the RI value identified by Type B is 1, and the RI value identified by Type C is any one of 1, 3, and 4.

When there are four CQI types Type A, Type B, Type C, and Type D, the RI value identified by the CQI type is:

the RI value identified by Type A is either of 1 and 2, the RI value identified by Type B is 1, the RI value identified by Type C is any one of 1, 2, and 3, and the RI value identified by Type D is any one of 1, 2, 3, and 4; or the RI value identified by Type A is either of 1 and 2, the RI value identified by Type B is 1, the RI value identified by Type C is either of 1 and 3, and the RI value identified by Type D is either of 1 and 4; or the RI value identified by Type A is either of 1 and 2, the RI value identified by Type B is 1, the RI value identified by Type C is any one of 1, 2, and 3, and the RI value identified by Type D is any one of 1, 3, and 4.

The CQI feedback pattern includes the following:

When the CQI feedback pattern includes three CQI types Type A, Type B, and Type C, the CQI feedback pattern is:

$$\underbrace{TypeC, \ldots, TypeC}_{N\_cqi\_typeC}, \underbrace{TypeA, \ldots, TypeA}_{N\_cqi\_typeA}, TypeB, \ldots, TypeB;\phantom{M\_cqi}$$

where, M_cqi, N_cqi_Type A, and N_cqi_Type C are parameters configured on a network side, and used to adjust the number of Type A, Type B, and Type C, the value ranges of N_cqi_Type A and N_cqi_Type C are 0 to M_cqi, and a sum of N_cqi_Type A and N_cqi_Type C is smaller than or equal to M_cqi.

When the CQI feedback pattern includes four CQI types Type A, Type B, Type C, and Type D, the CQI feedback pattern is:

$$\underbrace{TypeD, \ldots, TypeD}_{N\_cqi\_typeD}, \underbrace{TypeC, \ldots, TypeC}_{N\_cqi\_typeC}, \underbrace{TypeA, \ldots, TypeA}_{N\_cqi\_typeA}, TypeB, \ldots, TypeB;\phantom{M\_cqi}$$

where, M_cqi, N_cqi_Type A, N_cqi_Type C, and N_cqi_Type D are parameters configured on the network side, and used to adjust the number of Type A, Type B, Type C, and Type D, and the value ranges of N_cqi_Type A, N_cqi_Type C, and N_cqi_Type D are 0 to M_cqi, and a sum of N_cqi_Type A, N_cqi_Type C, and N_cqi_Type D is smaller than or equal to M_cqi.

Figure 11:
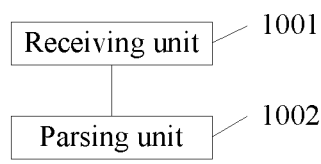
FIG. 11 is a composition block diagram of an apparatus for processing user equipment feedback information according to Embodiment 5 of the present invention.

The embodiment of the present invention further provides an apparatus for processing user equipment feedback information. As shown in FIG. 11, the apparatus includes a receiving unit 1001 and a parsing unit 1002.

The receiving unit 1001 is configured to receive feedback information sent by a user equipment, where the feedback information includes a CQI value and a PCI value.

The parsing unit 1002 is configured to parse the feedback information received by the receiving unit 1001, and obtain an RI value according to the CQI value or the PCI value.

Figure 12:
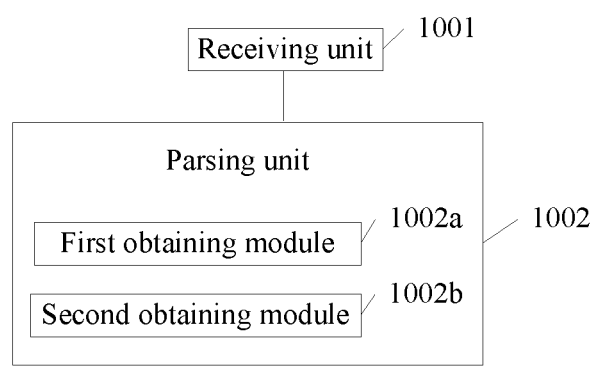
FIG. 12 is a composition block diagram of another apparatus for processing user equipment feedback information according to Embodiment 5 of the present invention.

Further, as shown in FIG. 12, the parsing unit includes a first obtaining module 1002a and a second obtaining module 1002b.

The first obtaining module 1002a is configured to obtain the RI value according to the CQI value.

The second obtaining module 1002b is configured to obtain the RI value according to the PCI value and correspondence between a PCI value and an RI value.

With the apparatus for transmitting and processing user equipment feedback information according to the embodiment of the present invention, a corresponding method for generating user equipment feedback information is set for either of RI values 3 and 4, and feedback is performed according to a preset feedback pattern, so that a user equipment is capable of transmitting feedback information with a maximum channel RI value of 4.

In addition, in this embodiment, information of an RI value is carried in CQI information, so that the size of user equipment feedback information is not changed when the RI value is 3 or 4, thereby saving transmission bandwidth of feedback information.

In addition, in this embodiment, a corresponding feedback pattern is set for a CQI type, so that a base station can accurately receive the user equipment feedback information.

Through the foregoing description of the embodiments, it is clear to persons skilled in the art that the present invention may be implemented by software plus necessary general hardware, and of course may also be implemented by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or an optical disk of a computer, and includes several instructions for instructing a computer device (which may be a personal computer, a server, or a network device) to perform the methods described in the embodiments of the present invention.

The foregoing description is merely about exemplary embodiments of the present invention, but is not intended to limit the protection scope of the present invention. Any variation or replacement made by persons skilled in the art within the technical scope disclosed in the present invention shall fall within the protection scope of the present invention. Therefore, the protection scope of the present invention shall be subject to the protection scope of the claims.

What is claimed is:

1. A method for transmitting user equipment (UE) feedback information, comprising:
by the UE:
obtaining rank indication (RI) of a radio channel, and corresponding channel quality indication (CQI) and precoding control indication (PCI) values which correspond to the RI, wherein a value of the RI is any one of 1, 2, 3, and 4;
generating feedback information according to the CQI value and the PCI value; and
sending the feedback information to a base station according to a CQI feedback pattern of at least one CQI type set to identify the RI value being any one of 1, 2, 3, and 4 based upon the CQI value or the PCI value,
wherein the obtaining RI of the radio channel, and the corresponding CQI and PCI values comprises:
obtaining a sending time for sending CQI, and obtaining the at least one CQI type corresponding to the sending time according to the CQI feedback pattern;
obtaining, in a precoding set corresponding to the RI value identified by the at least one CQI type, a precoding matrix matching a channel parameter of the radio channel, and using a rank value of the matching precoding matrix as the RI value of the radio channel;
determining the corresponding PCI value according to the matching precoding matrix;

obtaining a transportable data block size according to the matching precoding matrix and the parameter of the radio channel, and obtaining an index corresponding to the transportable data block size according to the transportable data block size; and
performing an operation on the index corresponding to the transportable data block size according to the at least one CQI type and the RI value to obtain the CQI value.

2. The method according to claim 1, wherein the at least one CQI type comprises two CQI types Type A and Type B, and the RI value identified by the at least one CQI type is:
the RI value identified by Type A is any one of 1, 2, 3, and 4, and the RI value identified by Type B is 1.

3. The method according to claim 1, wherein the at least one CQI type comprises three CQI types Type A, Type B, and Type C, and the RI value identified by the at least one CQI type is:
the RI value identified by Type A is either of 1 and 2, the RI value identified by Type B is 1, and the RI value identified by Type C is either of 3 and 4; or
the RI value identified by Type A is either of 1 and 2, the RI value identified by Type B is 1, and the RI value identified by Type C is any one of 1, 3, and 4.

4. The method according to claim 3, wherein the CQI feedback pattern is:

$$\underbrace{TypeC, \ldots, TypeC}_{N\_cqi\_typeC}, \underbrace{TypeA, \ldots, TypeA}_{N\_cqi\_typeA}, TypeB, \ldots, TypeB \overbrace{\phantom{XXXXXXXXXXXXXXXXXXXXXXXXXXXX}}^{M\_cqi}$$

wherein, M_cqi, N_cqi_Type A, and N_cqi_Type C are parameters configured on a network side, and used to adjust the number of Type A, Type B, and Type C, value ranges of N_cqi_Type A and N_cqi_Type C are 0 to M_cqi, and a sum of N_cqi_Type A and N_cqi_Type C is smaller than or equal to M_cqi.

5. The method according to claim 1, wherein the at least one CQI type comprises four CQI types Type A, Type B, Type C, and Type D, and the RI value identified by the at least one CQI type is:
the RI value identified by Type A is either of 1 and 2, the RI value identified by Type B is 1, the RI value identified by Type C is any one of 1, 2, and 3, and the RI value identified by Type D is any one of 1, 2, 3, and 4; or
the RI value identified by Type A is either of 1 and 2, the RI value identified by Type B is 1, the RI value identified by Type C is either of 1 and 3, and the RI value identified by Type D is either of 1 and 4; or
the RI value identified by Type A is either of 1 and 2, the RI value identified by Type B is 1, the RI value identified by Type C is any one of 1, 2, and 3, and the RI value identified by Type D is any one of 1, 3, and 4.

6. The method according to claim 5, wherein the CQI feedback pattern is:

$$\underbrace{TypeD, \ldots, TypeD}_{N\_cqi\_typeD}, \underbrace{TypeC, \ldots, TypeC}_{N\_cqi\_typeC}, \underbrace{TypeA, \ldots, TypeA}_{N\_cqi\_typeA}, TypeB, \ldots, TypeB \overbrace{\phantom{XXXXXXXXXXXXXXXXXXXXXXXXXXXXXXXXXX}}^{M\_cqi};$$

wherein, M_cqi, N_cqi_Type A, N_cqi_Type C, and N_cqi_Type D are parameters configured on a network side, and used to adjust the number of Type A, Type B, Type C, and Type D, value ranges of N_cqi_Type A, N_cqi_Type C, and N_cqi_Type D are 0 to M_cqi, and a sum of N_cqi_Type A, N_cqi_Type C, and N_cqi_Type D is smaller than or equal to M_cqi.

7. The method according to claim 1, wherein the PCI, RI, and CQI values comply with the following constraint condition:
any RI value corresponds to a PCI value set and a CQI value set; an RI value is uniquely determined according to the CQI value and PCI value; or an RI value is uniquely determined according to the CQI value and an Rib value.

8. A method for processing user equipment (UE) feedback information by a base station, the method comprising:
performing by the base station:
receiving feedback information sent by the UE in form of a feedback pattern of at least one channel quality indication (CQI) type set to identify a rank indication (RI) value based upon a CQI value or a precoding control indication (PCI) value; and
parsing the feedback information according to the feedback pattern to obtain the CQI value or the PCI value based upon the at least one CQI type, and obtain the RI value being any one of 1, 2, 3, and 4 according to the obtained CQI value or the PCI value, wherein the RI value, and the corresponding CQI and PCI values are obtained by the UE by:
  obtaining a sending time for sending CQI, and obtaining the at least one CQI type corresponding to the sending time according to a CQI feedback pattern;
  obtaining, in a precoding set corresponding to the RI value identified by the at least one CQI type, a precoding matrix matching a channel parameter of a radio channel corresponding to the RI, and using a rank value of the matching precoding matrix as the RI value of the radio channel;
  determining the corresponding PCI value according to the matching precoding matrix;
  obtaining a transportable data block size according to the matching precoding matrix and the parameter of the radio channel, and obtaining an index corresponding to the transportable data block size according to the transportable data block size; and
  performing an operation on the index corresponding to the transportable data block size according to the at least one CQI type and the RI value to obtain the CQI value.

9. The method according to claim 8, wherein the RI value is obtained according to the CQI value or the PCI value according information indicating a correspondence between the CQI value or the PCI value and the RI value.

10. An apparatus for transmitting user equipment feedback information, comprising:
  non-transitory computer readable storage medium to store instructions for instructing a computer; and
  computer hardware configured, including configured by the instructions, to implement:
    an obtaining unit configured to:
      obtain rank indication (RI) of a radio channel, and corresponding channel quality indication (CQI) and precoding control indication (PCI) values which correspond to the RI, wherein the RI value is any one of 1, 2, 3, and 4;
      obtain a sending time for sending CQI, and obtain the at least one CQI type corresponding to the sending time according to the CQI feedback pattern;
      obtain, in a precoding set corresponding to the RI value identified by the at least one CQI type obtained by the first obtaining module, a precoding matrix matching a channel parameter of the radio channel, and use a rank value of the matching precoding matrix as the RI value of the radio channel;
      determine the corresponding PCI value according to the matching precoding matrix;
      configured to obtain a transportable data block size according to the matching precoding matrix and the parameter of the radio channel, and obtain an index corresponding to the transportable data block size according to the transportable data block size; and
      perform, according to the at least one CQI type and the RI value, an operation on the index corresponding to the transportable data block size to obtain the CQI value; and
    a generating unit configured to generate feedback information according to the CQI value and the PCI value, and send the feedback information to a base station according to a CQI feedback pattern of at least one CQI type set to identify the RI value being any one of 1, 2, 3, and 4 based upon the CQI value or the PCI value.

11. The apparatus according to claim 10, wherein the at least one CQI type comprises two CQI types Type A and Type B, and the RI value identified by the at least one CQI type is:
  the RI value identified by Type A is any one of 1, 2, 3, and 4, and the RI value identified by Type B is 1.

12. The apparatus according to claim 10, wherein the at least one CQI type comprises three CQI types Type A, Type B, and Type C, and the RI value identified by the at least one CQI type is:
  the RI value identified by Type A is either of 1 and 2, the RI value identified by Type B is 1, and the RI value identified by Type C is either of 3 and 4; or
  the RI value identified by Type A is either of 1 and 2, the RI value identified by Type B is 1, and the RI value identified by Type C is any one of 1, 3, and 4.

13. The apparatus according to claim 12, wherein the CQI feedback pattern is:

$$\underbrace{TypeC, \ldots, TypeC}_{N\_cqi\_typeC}, \underbrace{TypeA, \ldots, TypeA}_{N\_cqi\_typeA}, TypeB, \ldots, TypeB;\overbrace{\phantom{TypeC, \ldots, TypeC, TypeA, \ldots, TypeA, TypeB, \ldots, TypeB}}^{M\_cqi}$$

wherein, M_cqi, N_cqi_Type A, and N_cqi_Type C are parameters configured on a network side, and used to adjust the number of Type A, Type B, and Type C, value ranges of N_cqi_Type A and N_cqi_Type C are 0 to M_cqi, and a sum of N_cqi_Type A and N_cqi_Type C is smaller than or equal to M_cqi.

14. The apparatus according to claim 10, wherein the at least one CQI type comprises four CQI types Type A, Type B, Type C, and Type D, and the RI value identified by the at least one CQI type is:
  the RI value identified by Type A is either of 1 and 2, the RI value identified by Type B is 1, the RI value identified by Type C is any one of 1, 2, and 3, and the RI value identified by Type D is any one of 1, 2, 3, and 4; or
  the RI value identified by Type A is either of 1 and 2, the RI value identified by Type B is 1, the RI value identified by Type C is either of 1 and 3, and the RI value identified by Type D is either of 1 and 4; or
  the RI value identified by Type A is either of 1 and 2, the RI value identified by Type B is 1, the RI value identified by Type C is any one of 1, 2, and 3, and the RI value identified by Type D is any one of 1, 3, and 4.

15. The apparatus according to claim 14, wherein the CQI feedback pattern is:

$$\underbrace{TypeD, \ldots, TypeD}_{N\_cqi\_typeD}, \underbrace{TypeC, \ldots, TypeC}_{N\_cqi\_typeC}, \underbrace{TypeA, \ldots, TypeA}_{N\_cqi\_typeA}, TypeB, \ldots, TypeB;\overbrace{\phantom{xxxxxxxxxxxxxxxxxxxxxxxxxxxxxxxxxxxxxxxxxxxxxxxxxxxxxxxxxxxxxxxxxxxx}}^{M\_cqi}$$

wherein, M_cqi, N_cqi_Type A, N_cqi_Type C, and N_cqi_Type D are parameters configured on a network side, and used to adjust the number of Type A, Type B, Type C, and Type D, and value ranges of N_cqi_Type A, N_cqi_Type C, and N_cqi_Type D are 0 to M_cqi, and a sum of N_cqi_Type A, N_cqi_Type C, and N_cqi_Type D is smaller than or equal to M_cqi.

16. The apparatus according to claim 10, wherein the PCI, RI, and CQI values comply with the following constraint condition, wherein the constraint condition comprises:
any RI value corresponds to a PCI value set and a CQI value set; an RI value is uniquely determined according to the CQI value and PCI value; or an RI value is uniquely determined according to the CQI value and an Rib value.

17. An apparatus for processing user equipment feedback information, comprising:
non-transitory computer readable storage medium to store instructions for instructing a computer; and
computer hardware configured, including configured by the instructions, to implement:
a receiving unit, configured to receive feedback information sent by the UE in form of a feedback pattern of at least one channel quality indication (CQI) type set to identify a rank indication (RI) value based upon a CQI value or a precoding control indication (PCI) value; and
a parsing unit, configured to parse the feedback information according to the feedback pattern to obtain the CQI value or the PCI value based upon the at least one CQI type, and obtain the RI value being any one of 1, 2, 3, and 4 according to the obtained CQI value and the PCI value,
wherein the RI value, and the corresponding CQI and PCI values are obtained by the UE by:
obtaining a sending time for sending CQI, and obtaining the at least one CQI type corresponding to the sending time according to a CQI feedback pattern;
obtaining, in a precoding set corresponding to the RI value identified by the at least one CQI type, a precoding matrix matching a channel parameter of a radio channel corresponding to the RI, and using a rank value of the matching precoding matrix as the RI value of the radio channel;
determining the corresponding PCI value according to the matching precoding matrix;
obtaining a transportable data block size according to the matching precoding matrix and the parameter of the radio channel, and obtaining an index corresponding to the transportable data block size according to the transportable data block size; and
performing an operation on the index corresponding to the transportable data block size according to the at least one CQI type and the RI value to obtain the CQI value.

18. The apparatus according to claim 17, wherein the RI value is obtained according to the CQI value or the PCI value according to information indicating a correspondence between the CQI value or PCI value and the RI value.

* * * * *